Jan. 13, 1931.　　　E. H. REMDE　　　1,789,023
INDUSTRIAL TRUCK
Filed Feb. 2, 1929　　5 Sheets-Sheet 1

Jan. 13, 1931.  E. H. REMDE  1,789,023
INDUSTRIAL TRUCK
Filed Feb. 2, 1929   5 Sheets-Sheet 2

Fig. 2

INVENTOR
Edward H. Remde
By
Geo. B Pitts
ATTORNEY

Patented Jan. 13, 1931

1,789,023

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed February 2, 1929. Serial No. 336,963.

This invention relates to an industrial truck, more particularly a truck of the tiering type.

One object of the invention is to provide a truck of this type in which the guide for the load raising and carrying member may be tilted or swung into an inclined position so that the weight of the load will be carried substantially uniformly by all of the truck supporting wheels and danger of the load being jolted off the load carrying member is materially reduced or substantially eliminated.

Another object of the invention is to construct a truck of this character wherein provision is made for positioning the load carrying member close to the floor to engage a load and for movably mounting the guide for the load carrying member whereby it may be positioned at an inclination without causing its lower end to project beyond the peripheries of the adjacent truck wheels, thereby permitting the truck to be stored or turned in a minimum area, whether it is carrying a load or not.

Another object of the invention is to provide a truck of this character wherein the guide is mounted to tilt inwardly and provision is made for moving the guide inwardly and outwardly.

Another object of the invention is to construct a tiering type of elevating truck having means for limiting the travel of the load carrying member in one or either direction and to provide for the tilting of the guide for the load carrying member without affecting the operation of the limiting means.

Other objects of the invention will be apparent to those skilled in the art to which my invention relates from the following description taken in connection with the accompanying drawings, wherein.

Figure 2:
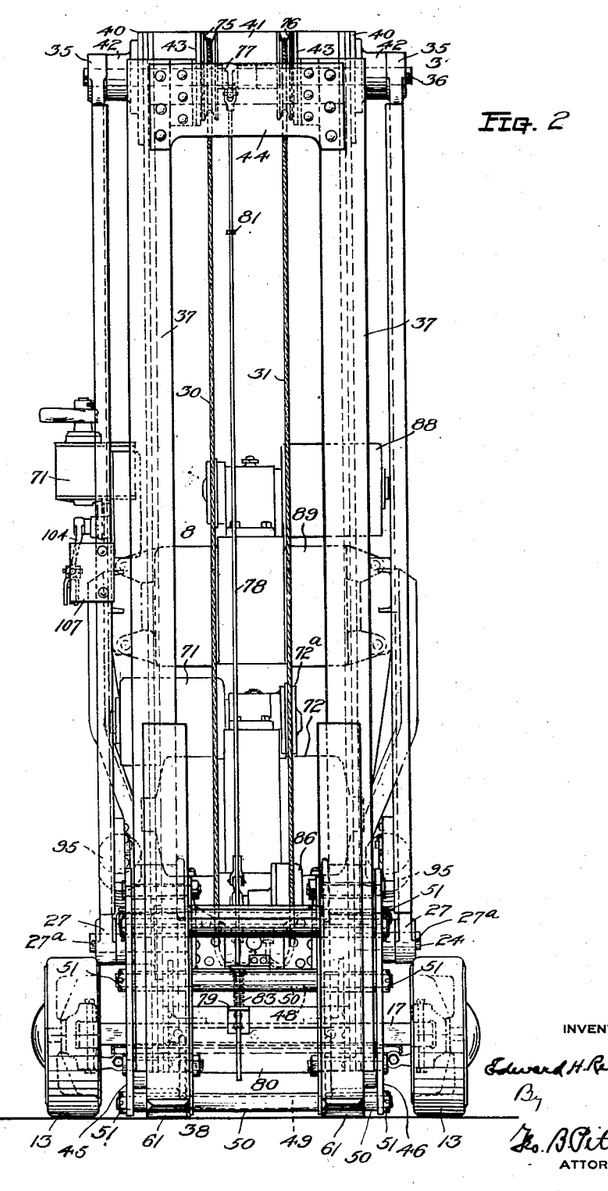
Fig. 2 is an end elevation looking toward the left of Fig. 1.
Figure 3:
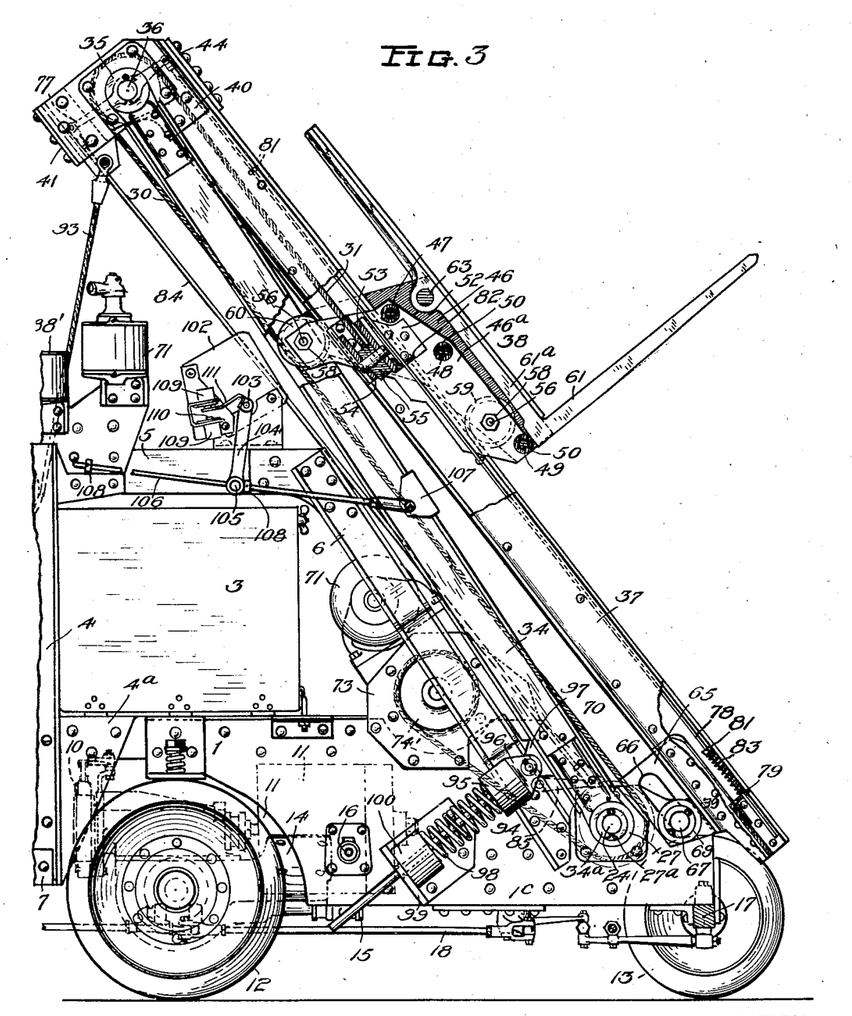
Fig. 3 is a fragmentary view of parts shown in Fig. 1, but showing the guide inclined.

In the drawings, 1 indicates a frame preferably comprising a main section 1a and a relatively low section 1b connected in rigid relation to the main section 1a by side plates 1c. 2 indicates the electric batteries supported on the main section 1a, these being preferably enclosed in a sheet metal casing 3 having one or more removable sections or walls. 4 indicates a pair of uprights (only one being shown in Figs. 1 and 3) secured to the frame 1 at its driving end and braced by gussets 4a. The upper end of each upright 4 is connected to the outer portion of the low frame section 1b or the outer portion of the adjacent side plate 1c by a pair of connected bars 5, 6, to insure rigidity between the frame sections and the uprights. At their lower ends, the uprights 4 carry brackets 7 and these in turn pivotally support an operative's platform 8. 9 indicates a foot pedal associated with the platform 8 and arranged to release a brake mechanism 10 which engages and disengages a wheel or other element driven by a motor 11, supplied with current from the batteries 2. 12, 13, indicate pairs of wheels for supporting the frame 1, the former being below the main frame section 1a and driven in a well known manner by the motor 11 through suitable power transmitting mechanism. The power transmitting mechanism is enclosed in a suitable housing and the latter terminates in a cradle 14 to which the motor 11 is rigidly connected, as shown in Fig. 3. The cradle 14 is supported by a torque member 15 trunnioned at 16 in the side plates 1c and connected by a universal joint to the cradle 14, the construction and arrangement of the torque and its connections being substantially similar to like parts shown in Letters Patent No. 1,628,145, dated May 10, 1927. The wheels 12 are mounted on knuckles in a well known manner for steering purposes; likewise the wheels 13 are knuckle mounted on the opposite ends of an axle 17, as shown in dotted lines in Fig. 2. Both pairs of wheels are connected by connections 18, for simultaneous steering, and these connections lead to a bell-crank 18, suitably mounted on one of the brackets 7, and operated through a link 19 by a lever 20. 21 indicates a controller for controlling the supply of current to the motor 11 to drive it in one direction or the other. The controller shaft 21a is connected to a linkage 22, which is connected to an operating handle 23. The handle 23 is detachably connected to the linkage so that it may be moved to an inoperative position. To facilitate the illustration of other parts, the handle 23 is shown in its inoperative position. When connected to the linkage 22, and the controller is in neutral position, the handle 23 projects horizontally.

24 indicates a shaft or pivot pin mounted on the low frame section 1b near its outer end. The side plates 1c are formed with aligned openings 25 through which the shaft extends, its free ends being supported in journals 26 suitably secured to the outer sides of the side plates 1c. Collars or washers 27 are mounted on the ends of the shaft and held thereon by cotter pins 27a, the latter serving to prevent endwise movement of the shaft. Between the side plates 1c, the shaft 24 rotatably supports reeving elements 28, 29, for flexible members 30, 31. Where the flexible members 30, 31, consist of cables, the elements 28, 29, comprise sheaves. The sheaves 28, 29, are held against endwise movement on the shaft 24 and in spaced relation to each other and the side plates 1c by spacing sleeves 32, 32, 33. The parts just referred to form part of a hoisting mechanism, which will be later referred to.

Figure 5:
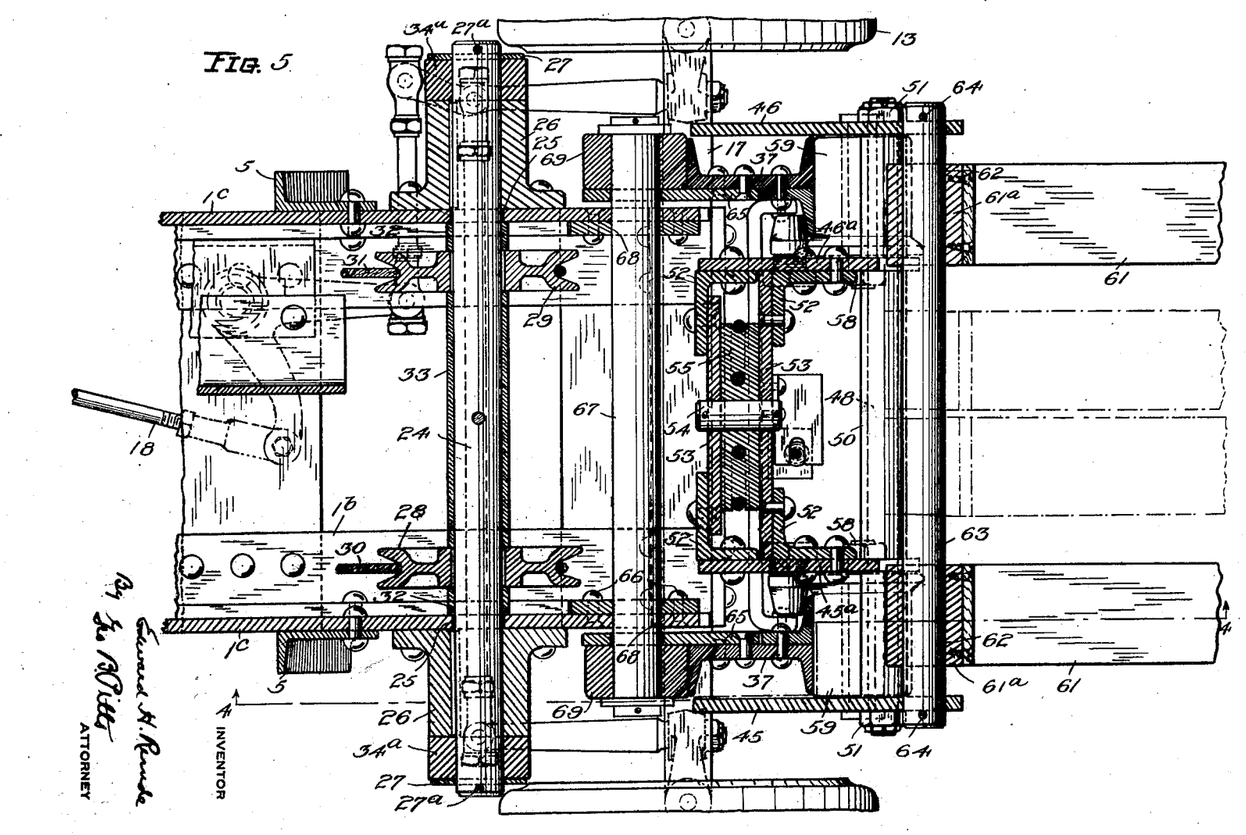
Fig. 5 is a section on the line 5—5 of Fig. 4.

34 indicates a pair of members swingably mounted at their lower ends on the shaft 24. For this purpose the lower end of each member 34 is provided with a casting terminating in a knuckle 34a through which the shaft 24 extends so that the member 34 may swing about the shaft, the knuckle being disposed between the adjacent journal 26 and washer 27, as shown in Fig. 5. The upper ends of the members 34 are also provided with castings terminating in knuckles 35, which rotatably support the opposite ends of a shaft 36, the latter being held against endwise movement by cotter pins 35a. 37 indicates a pair of spaced guides for an elevating member 38 connected at their upper ends to the shaft 36 and depending therefrom. The shaft 36 serves to support the guides 37 and elevating member 38 when the guides are in vertical position (see Fig. 1) and to swing the upper ends of the guides inwardly when the members 34 are tilted or swing about the shaft 24, for example, to the position shown in Fig. 3. The lower ends of the guides 37 have sliding and pivotal engagement or connection with the low frame section 1b, such connection being indicated as an entirety at 39, so that when the guides are tilted inwardly, a portion of the weight of the guides and elevating member is carried by the low frame section 1b instead of by the members 34. The connection 39 serves to prevent outward movement of the guides 37 should the upper ends of the members 34 swing forwardly unduly. The connection 39 is above the axle 17 and the guides 37 extend below the latter, so that the axle serves as a stop to limit the forward movement of the guides 37 and members 34 at their upper ends in the event of breakage of some part or failure of the limit switch (to be later referred to) to operate. The connection between the guides 37 and shaft 36 may comprise brackets 40 fixed to the guides and extending inwardly at right angles thereto and braced at their inner ends by a cross member 41 and journals 42 carried on the outer sides of these brackets, the shaft 36 extending through openings formed in the brackets and rotatably fitting the journals. The shaft 36 is preferably reinforced intermediate the brackets by bridge members 43 connected to the cross member 41 and a cross member 44 carried by the guides 37.

The elevating member 38 consists of the following: 45—45a, 46—46a, indicate pairs of inner and outer plates, these plates being formed with aligned openings through which extend rods 47, 48, 49. Sleeves 50 surround each rod between the plates to space the latter and nuts 51 on the ends of the rods serve to clamp the plates and sleeves in rigid relation, one relative to the other. The plates 45a, 46a, are also connected in rigid spaced relation by pairs of angles 52 and plates 53 connected to the angles. The plates 53 are in spaced relation and support the opposite ends of a shaft 54 on which rocks an equalizer 55, to which reference will later be made. Each pair of plates 45—45a, 46—46a, are also connected in rigid relation. For example, the plates 45—45a are connected by the following parts: 56 indicates rods extending through aligned openings formed in the plates, each rod being surrounded by a sleeve or bushing 57; the outer ends of the rods are provided with heads which engage the plate 45, whereas their inner ends are threaded to take nuts 58, which, when tightened against the plates 45a secure the plates against the ends of the bushing 57.

The bushing 57 on one rod 56 serves as a shaft for a roller 59 which rolls on one surface or way of the adjacent guide 37 and the bushing 57 on the other rod 56 serves as a shaft for a roller 60, which rolls on the opposite surface or way of the adjacent guide 37, the rollers 59—60 between the pairs of plates 45—45a, 46—46a, co-operating to movably support the elevating member on the guides. The load engaging device of the elevating member preferably comprises a plurality of L-shaped members 61 (preferably two members), the upright portions 61a of which are formed with transverse openings 62 through which extends a rod 63 having support at its opposite ends in the plates 45, 46, as shown in Fig. 5. The rod 63 is held against endwise movement by cotter pins 64. The portions 61a of the L-shaped members 61 are slidable on the bar 63 (see dotted lines in Fig. 5) to adjust them relative to each other according to the size of the load to be engaged and moved.

Figure 1:
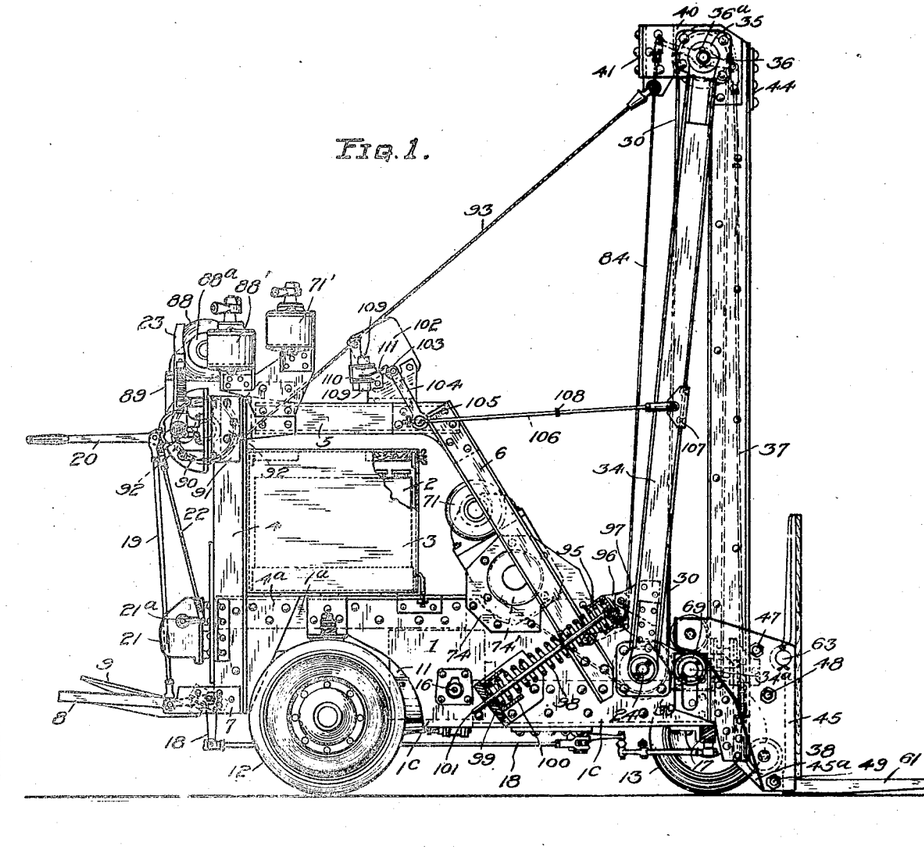
Fig. 1 is a side view of a truck embodying my invention.

Of the connection 39, 65 indicates a plate secured to the inner side of each guide 37 and extending inwardly therefrom. The extended portion of the plate is formed with an elongated opening 66 through which extends a shaft 67. The plates 65 are disposed on the outer sides of the side plates 1c. The plates 1c are formed with aligned openings 68 to receive the shaft 67 and support it relatively stationary. 69 indicates rollers loosely mounted on the outer or free ends of the shaft 67 and arranged to be engaged by the inner surfaces or ways of the guides 37. As shown in Fig. 1, when the guides are in normal or vertical position, their lower portions engage the rollers 69 so that the latter or the shaft on which they are mounted form an abutment for the guides; but when the suporting members 34 are swung inwardly, they bodily raise and also swing the guides in the same direction; accordingly the guides move around the axis of the shaft 67 and also roll on the rollers 69. It might be noted that the major axes of the openings 66 are parallel to the guides 37 and spaced therefrom equal to the radius of the rollers 69; hence in the movement of the guides to the position shown in Fig. 3 and back to the position shown in Fig. 1, the shaft 67 will traverse the openings 66. Through the engagement of the walls of the openings 66 with the shaft 67, the guides 37 are interlocked with the low frame section 1b and as a result danger of the lower ends of the guides swinging away from its abutment or relative to the low frame is eliminated. It will also be noted that the plates 65 overlap the outer ends of the side plates 1c and are arranged in close relation thereto, the purpose being to prevent lateral swinging of the guides. My construction permits the guides to be supported and tilted in a relatively simple manner; at the same time it insures rigidity and steadiness of the guides when in either normal or tilted position. As a result the truck may be driven over uneven surfaces without danger of tipping the load.

Figure 4:
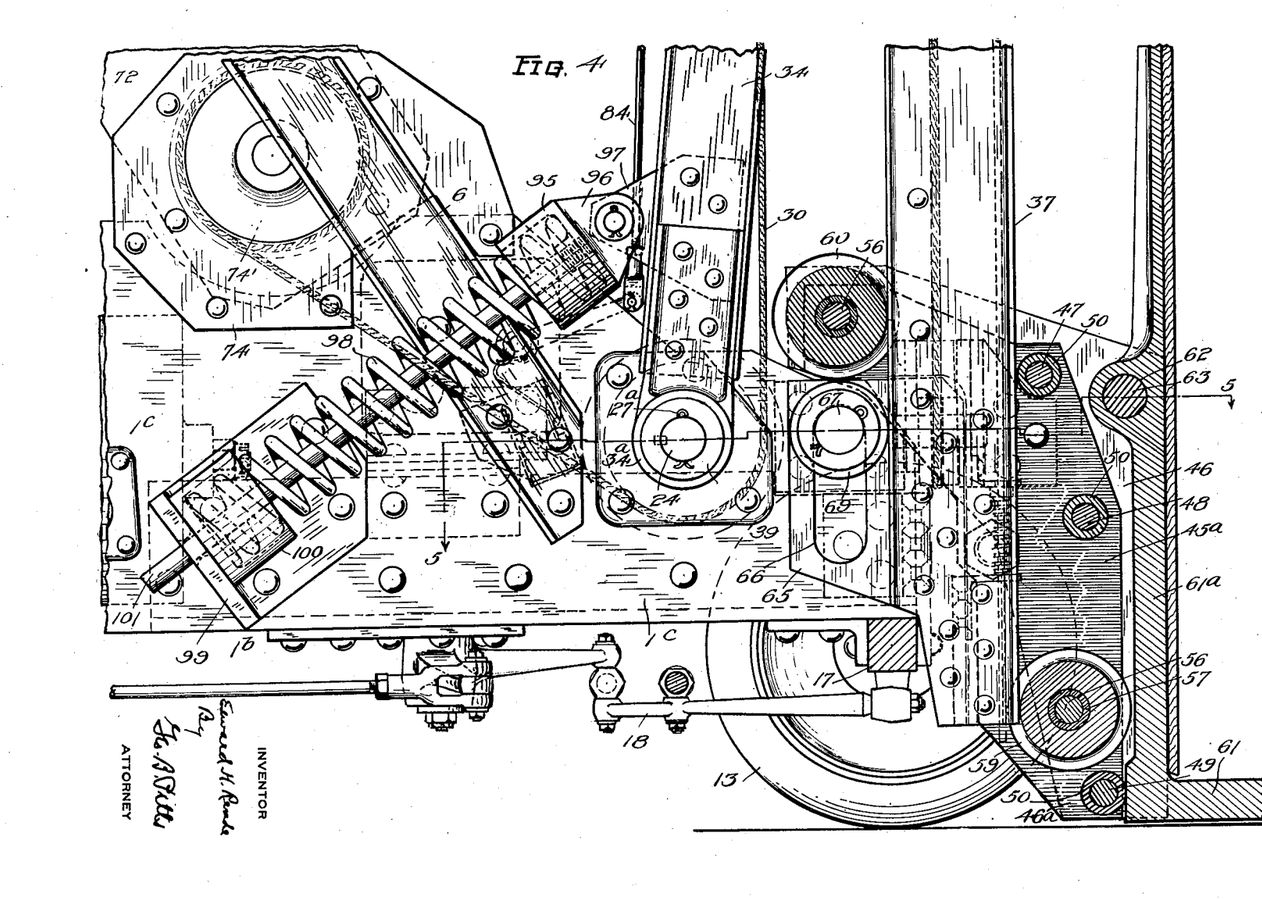
Fig. 4 is a section on the line 4—4 of Fig. 5.

70 indicates as an entirety the means for raising and lowering the elevating member 38 on the guides 37. Of these means, 71 indicates a motor which is supplied with current from the batteries 2; the current being controlled by a controller 71'. The motor 71 is supported on a housing 72. The housing is supported at its opposite sides by plates 74 secured thereto and to the side plates 1c, as shown in Figs. 1, 3 and 4. Within the housing 72 are mounted suitable drums 74' on which the cables 30, 31, wind or unwind simultaneously according to the direction of rotation of the shaft of the motor 71. The shaft of the motor is automatically held against rotation or freed by a magnetically operated brake, enclosed in the casing 72a, the winding of the electro-magnet being connected in series with the motor and arranged to release the motor shaft when the circuit to the motor is closed. The drums are connected to a shaft mounted within the casing 72 and this shaft is driven through suitable reduction gearing by the shaft of the motor 71. If desired, reduction gearing may be interposed between the driven shaft and each drum 74'.

The construction of the driving mechanism for the drums, motor, motor mounting and brake for its shaft may be similar in construction to like parts shown in my application Ser. No. 133,699, except that the drum shaft carries drums instead of sprockets for chains. From the drums 74', the cables 30, 31, extend to and reeve around the sheaves 28, 29, which are mounted on the shaft 24, so that they will always bear the same relation to the supporting and swinging members 34 in any position thereof. From the sheaves 28, 29, the cables 30, 31, extend to and around sheaves 75, 76, loosely mounted on the shaft 36, and from the latter sheaves the cables extend downwardly and are connected to the equalizer 55 in any desired manner. The sheaves 75, 76, are spaced from each other on the shaft 36 and in close relation to the plates or bridges 43 by one or more sleeves or collars, one thereof being the hub of a bell crank 77, to which reference will later be made. By mounting the sheaves 28—29, 75—76, in the manner set forth, the elevating member may be raised or lowered with the guides in normal position or in tilted position.

78 indicates a rod pivotally connected at its upper end to one arm of the bell chank 77 and depending downwardly therefrom parallel to and between the guides 37, the lower end of the rod slidably fitting an opening formed in a bracket 79, the bracket being supported on a plate 80 extending between the guides. The rod 78 carries near its upper and lower ends tappets 81 adjustably fixed thereto and the elevating member carries an engaging device, such as a plate 82, fixed to and projecting from the outer plate 53 (see Fig. 5) adapted to engage the upper tappet 81 when the elevating member approaches its limit of movement upwardly and adapted to engage the lower tappet 81 when the elevating member approaches its limit of movement downwardly, the engagement of the member 82 with either tappet serving to move the rod endwise and to break the circuit to the motor 71 as will later appear. Following the movement of the rod upwardly and operation of the elevating member 38 downwardly, the rod 78 will return to its normal position due to its own weight, but to effect return of the rod to normal position following its movement downwardly and operation of the elevating member upwardly, I provide between the lower tappet 81 and the bracket 79 a coiled spring 83 which is put under tension by the adjacent tappet 81 when the latter is engaged and operated, so that upon movement of the elevating member upwardly the rod and the operating parts connected thereto will return to their normal position ready to be moved in either direction. The other arm of the bell crank 77 has pivotally connected to it one arm of a link 84, which depends downwardly, its lower end being pivotally connected to an arm 85. The arm 85 is fixed to a rock shaft mounted in a casing 86 (see Fig. 2) which encloses a switch mechanism comprising pairs of switch contacts, the rock shaft carrying a device which operates one contact of either pair to open the motor circuit accordingly as the rod 78 is moved in one or the other direction, as already described. The switch mechanism is preferably similar in construction to the mechanism shown in my application filed January 5, 1923, Ser. No. 610,791 (see Letters Patent No. 1,726,717).

87 indicates as an entirety the means for tilting or swinging the members 34 inwardly from their normal or upright position and for controlling their movement from the tilted position back to their normal position. Of these means, 88 indicates a motor which is supplied with current from the batteries 2; the current being controlled by a controller 88'. The motor 88 is supported on a housing 89. The housing is provided at its opposite ends with projecting ears 90 secured to plates 91 which in turn are secured to the upper ends of the uprights 4. Within the housing 89 are mounted suitable drums 92 on which cables 93 wind or unwind simultaneously according to the direction of rotation of the shaft of the motor 88. The shaft of the motor is automatically held against rotation or freed by a magnetically operated brake, enclosed in the casing 88a, the winding of the electro-magnet being connected in series with the motor and arranged to release the motor shaft when the circuit to the motor is closed. The drums 92 are connected to a shaft mounted within the casing 89 and this shaft is driven through suitable reduction gearing by the shaft of the motor 88. If desired, reduction gearing may be interposed between the driven shaft and each drum 92. The construction of the drums 92, the driving mechanism therefor, motor, motor mounting and brake for the motor shaft may be similar to like parts for operating the cables 30, 31.

In my improved construction, the pivot or shaft 24 for the swingable members are arranged as near the outer end of the low frame section as possible, so that the swingable members may be tilted to an extreme position of inclination, as shown in Fig. 3, which position is substantially 45° to the vertical. When in this position, the load carrying member 38 forms a cradle for the load and thus eliminates danger of the load or portions thereof being jolted off. For this reason, the truck may be advantageously used for handling and transporting packs of sheet steel or other sheet material, whether such packs are crated or bound together or in stacked relation without binding means around them.

By inclining the members 34 to the position shown, all portions of the elevating member 38, when moved upward as shown in Fig. 3, will be positioned inwardly of the outer extremities of the wheels 13; that is, the free ends of the members 61 will not project beyond the wheels 13, so that the truck may be stored, turned or manipulated in a restricted area. However, it will be noted that when the members 34 are tilted to the position shown and the elevated member 38 is moved upwardly the center of gravity of these parts, that is, the members 34, guides 37 and elevating member 38, moves or shifts to a point inwardly of the shaft 24. For this reason I provide means, indicated as an entirety at 94, for (a) yieldingly arresting the inward movement of the members 34, upon the stopping of the motor 88 and (b) for swinging or returning the members outwardly, upon the paying out of the cables 93, far enough to shift the center of gravity outwardly of the shaft 24. The arresting and return means 94 comprise a set of devices between each swingable member 34 and the frame 1. As these sets of devices are similar I will describe one set as follows: 95 indicates a socket or cup member having an ear 96 pivotally connected to a lug 97 carried by the adjacent member 34. The socket 95 forms a seat for one end of a coiled spring 98, the opposite end of the spring engaging a bracket 99 mounted on the adjacent side plate 1c or seated within a cup member 100. 101 indicates a rod extending through the coils of the spring 98 to guide the coils as they are compressed or expanded and to prevent undue buckling thereof. The upper end of the rod 101 is secured in any desired manner to the bottom of the socket 95 and centrally thereof; the opposite end of the rod extends through registering openings formed in the cup member 100 and bracket 99, centrally of the cup member; these openings being large enough to permit the rod to rock or swivel as well as slide therein due to the arc traversed by the socket 95 as the member 34 swings inwardly and outwardly.

The limit means for shutting off or stopping the motor 88 when the swingable members 34 reach their limit of movement in either direction comprise the following parts: 102 indicates a casing enclosing a switch mechanism having two pairs of contacts and an operating device which moves one contact of either pair to break the circuit accordingly as the members 34 move in one or the other direction. The switch mechanism just referred to is similar in construction to the switch mechanism for stopping the motor 71. The operating device is connected to a rock shaft 103 which carries an arm 104. The outer end of the arm is bifurcated and the bifurcations are hollowed out to form bearings for a block 105 capable of rocking therein. The block is formed with a transverse opening to slidably receive a rod 106 pivotally connected at its outer end to a bracket 107 fixed in any desired manner to the adjacent swingable member 34. At opposite sides of the arm 104, the rod 106 carries adjustable tappets 108, the outer one of which engages and moves the arm 104 in one direction to open the motor circuit when the members 34 approach their limit of movement inwardly as shown in Fig. 3 and the other of which engages and moves the arm in the opposite direction to open the motor circuit when the members 34 approach their limit of movement in the outward direction as shown in Fig. 1.

The limit means for stopping the motor 88 are arranged to break the circuit when the members approach their limit of movement and the arresting springs are of such strength that they arrest the members 34 at this position whether the elevating member is loaded and with or without a load it is raised to its highest position. To tilt the members 34, the cables 93 are wound on the drums 92, thereby pulling the upper ends of the members 34 inwardly in opposition to the springs 98 until the motor is stopped. When the motor is stopped the drums will be held against rotation; hence the cables 93 will hold the members in their inclined position and prevent the springs 98 from moving the members outwardly; but upon paying out of the cables 93 the springs 98 will move the members 34 outwardly and keep the cables 93 taut between the members 34 and the drums during such movement.

It will thus be seen that while the cables 93 move the members 34 inwardly and the springs move them outwardly, the movement of the members in both directions is under the control of the drums or the motor 88 for driving them.

Each of the motors 71 and 88 are compound wound and the circuit is shunted through the armature; accordingly, any coasting of the armature shaft of the motor following the breaking of the circuit through one pair of switch contacts of the adjacent switch mechanism because of failure of the brake associated with the motor to act quickly, will result in the generation of an electric current. To eliminate this condition, each limit means is provided with an auxiliary switch mechanism the purpose of which is to break the shunt circuit preferably simultaneously with the breaking of the motor circuit. To facilitate the illustration, I have shown but one auxiliary switch mechanism, namely, that associated with the limit means for stopping the motor 88. The auxiliary switch mechanism comprises pairs of contacts connected in the shunt circuit, one pair being mounted in each casing member 109 and a lever fixed to and operated by the arm 104 for operating the movable contact of either pair. The movable contacts are mounted on plungers 110 which are movable inwardly into the casing members 109 to open the circuits, but are constantly acted upon by a spring (not shown) to move them outwardly. The lever is disposed between the plungers 110 and operates one when the swingable members move to the position shown in Fig. 1 and operates the other when the swingable members move to the position shown in Fig. 3. The lever 111 may be formed of resilient metal to permit yielding engagement with the plungers and to allow for full movement of the arm 104.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a wheel mounted frame, guides at one end thereof, a member pivotally mounted at its lower end on said frame near its load carrying end and pivotally connected at its upper end to the upper portion of said guides and arranged to support the guides substantially vertically when in one position and to tilt the guides inwardly into an inclined position when swung about its pivot, an elevating member mounted for movement along said guides, means for moving said elevating member, separate means for swinging said swingable member inwardly, and a connection between the lower ends of said guides and said frame permitting said guides to move upwardly and swing relative to said frame when said swingable member is tilted.

2. In apparatus of the class described, the combination of a wheel mounted frame, guides at one end thereof, a member pivotally mounted at its lower end on said frame near its load carrying end and pivotally connected at its upper end to the upper portion of said guides and arranged to support the guides substantially vertically when in one position and to tilt the guides inwardly into an inclined position when swung about its pivot, an elevating member mounted for movement along said guides, means for moving said elevating member, separate means for swinging said swingable member inwardly, and a connection between the lower ends of said guides and said frame permitting said guides to move upwardly and swing relative to said frame when said swingable member moves inwardly, said connections serving to prevent outward movement of the lower ends of said guides.

3. In apparatus of the class described, the combination of a wheel mounted frame, guides at one end thereof, a member pivotally mounted at its lower end on said frame near its load carrying end and pivotally connected at its upper end to the upper portion of said guides and arranged to support the guides substantially vertically when in one position and to tilt the guides inwardly when swung about its pivot, said guides having slidable pivotal engagement at their lower ends with said frame, an elevating member mounted for movement along said guides, means for moving said elevating member, separate means for swinging said swingable member inwardly, and means for arresting the inward movement of said swingable member upon the stopping of said moving means and for swinging said member outwardly.

4. In apparatus of the class described, the combination of a wheel mounted frame, guides at one end thereof, a member pivotally mounted at its lower end on said frame near its load carrying end and pivotally connected at its upper end to the upper portion of said guides and arranged to support the guides substantially vertically when in one position and to tilt the guides inwardly when swung about its pivot, said guides having slidable and pivotal engagement at their lower ends with said frame, an elevating member mounted for movement along said guides, means for moving said elevating member, separate means for swinging said swingable member inwardly, and means for yieldingly arresting the inward movement of said swingable member upon the stopping of said moving means and for swinging said member outwardly.

5. In apparatus of the class described, the combination of a wheel mounted frame, an axle adjacent the forward end of said frame for certain of the wheels therefor, guides adjacent the forward end of said frame, a member pivotally mounted at its lower end on said frame near its load carrying end and pivotally connected at its upper end to the upper portion of said guides and arranged to support the guides substantially vertically when in one position and to tilt the guides inwardly into an inclined position when swung about its pivot, said guides extending downwardly and disposed outwardly of said axle for the adjacent wheels, an elevating member mounted for movement along said guides, means for moving said elevating member, separate means for swinging said swingable member inwardly, and a connection between said guides and said frame permitting said guides to move upwardly and swing relative to said frame when said swingable member moves inwardly, said connection co-operating with the axle for the adjacent wheels to prevent movement of the upper ends of the guides outwardly beyond their vertical position.

6. In apparatus of the class described, the combination of a wheel mounted frame, guides at one end thereof, a member pivotally mounted at its lower end on said frame and pivotally connected at its upper end to the upper portion of said guides and arranged to support the guides substantially vertically when in one position and to tilt the guides inwardly when swung about its pivot, an elevating member mounted for movement along said guides, means for moving said elevating member, separate means for swinging said swingable member inwardly, and a connection between the lower ends of said guides and said frame permitting said guides to move upwardly and swing relative to said frame when said swingable member moves inwardly, and a limit means for stopping the moving means for said elevating member when it reaches its limit of movement in one direction, said limit means being operable in any position of said guides.

7. In apparatus of the class described, the combination of a wheel mounted frame, an axle adjacent the forward end of said frame for certain of the wheels therefor, guides adjacent the forward end of said frame, a member pivotally mounted at its lower end on said frame near its outer end and pivotally connected at its upper end to the upper portion of said guides and arranged to support the guides substantially vertically when in one position and to tilt the guides inwardly into an inclined position when swung about its pivot, said guides extending downwardly and disposed outwardly of said axle for the adjacent wheels, an elevating member mounted for movement along said guides, means for moving said elevating member, said means comprising a power driven drum, a flexible member arranged to wind on and off said drum, a guiding element rotatable on the axis on which said swingable member pivots and around which said flexible member runs, a guiding element at the upper end of said guides and around which said flexible member runs and a connection for the outer end of said flexible member with said elevating member, and separate means for swinging said pivotally mounted member in one direction.

8. In apparatus of the class described, the combination of a wheel mounted frame, an axle adjacent the forward end of said frame for certain of the wheels therefor, guides adjacent the forward end of said frame, a member pivotally mounted at its lower end on said frame and pivotally connected at its upper end to the upper portion of said guides and arranged to support the guides substantially vertically when in one position and to tilt the guides inwardly when swung about its pivot, said guides extending downwardly and disposed outwardly of said axle for the adjacent wheels, an elevating member mounted for movement along said guides, means for moving said elevating member, separate means for swinging said swingable member inwardly, said separate means comprising a power driven drum and a flexible member arranged to wind on and off said drum and connected at the upper end of said swingable member, and means for arresting the inward movement of said swingable member when said drum is stopped and to move said swingable member outwardly upon the operation of said drum to pay out said flexible member.

9. In apparatus of the class described, the combination of a wheel mounted frame, an axle adjacent the forward end of said frame for certain of the wheels therefor, guides adjacent the forward end of said frame, a member pivotally mounted at its lower end on said frame and pivotally connected at its upper end to the upper portion of said guides and arranged to support the guides substantially vertically when in one position and to tilt the guides inwardly when swung about its pivot, an elevating member mounted for movement along said guides, mechanism for moving said elevating member, means for swinging said swingable member in one direction, and separate means for swinging said member in the opposite direction.

10. In apparatus of the class described, the combination of a wheel mounted frame comprising a main section, a low load carrying section and side plates connecting the sections together, guides at the outer end of said low section, a shaft mounted in said side plates, a pair of members pivotally mounted at their lower ends on said shaft and pivotally connected at their upper end to the upper portions of said guides and arranged to support the latter substantially vertically when in one position and to tilt the guides inwardly into an inclined position when swung about its pivot, an elevating member mounted for movement along said guides, means for moving said elevating member, separate means for swinging said swingable members inwardly, and a connection between the lower ends of said guides and said frame permitting said guides to move upwardly and swing relative to said frame when said swingable members are tilted.

11. In apparatus of the class described, the combination of a wheel mounted frame comprising a main section and a low section, guides at the outer end of said low section, a member pivotally mounted at its lower end on said frame near its outer end and pivotally connected at its upper end to the upper portion of said guides and arranged to support the guides substantially vertically when in one position and to tilt the guides inwardly into an inclined position when swung about its pivot, an elevating member mounted for movement along said guides, means mounted on said low section for moving said elevating member, separate means mounted on said main section for swinging said swingable member inwardly, and a connection between the lower ends of said guides and said frame permitting said guides to move upwardly and swing relative to said frame when said swingable member moves inwardly.

In testimony whereof, I have hereunto subscribed my name.

EDWARD H. REMDE.